US009652305B2

(12) United States Patent
Arekapudi et al.

(10) Patent No.: US 9,652,305 B2
(45) Date of Patent: May 16, 2017

(54) TRACKING SOURCE AVAILABILITY FOR INSTRUCTIONS IN A SCHEDULER INSTRUCTION QUEUE

(71) Applicant: Advanced Micro Devices, Inc., Sunnyvale, CA (US)

(72) Inventors: Srikanth Arekapudi, Sunnyvale, CA (US); Emil Talpes, San Mateo, CA (US); Sahil Arora, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 155 days.

(21) Appl. No.: 14/452,923

(22) Filed: Aug. 6, 2014

(65) Prior Publication Data
US 2016/0041853 A1 Feb. 11, 2016

(51) Int. Cl.
*G06F 9/44* (2006.01)
*G06F 9/54* (2006.01)
*G06F 9/48* (2006.01)

(52) U.S. Cl.
CPC ............ *G06F 9/542* (2013.01); *G06F 9/4881* (2013.01)

(58) Field of Classification Search
CPC .. G06F 9/3885; G06F 9/3877; G06F 9/30043; G06F 9/3842
See application file for complete search history.

(56) References Cited

U.S. PATENT DOCUMENTS

| 8,427,892 | B2* | 4/2013 | Venkataraman | G06F 13/1689 365/189.16 |
| 8,495,651 | B2* | 7/2013 | Kanai | G06F 9/45537 718/107 |
| 2002/0069351 | A1* | 6/2002 | Chi | G06F 9/3804 712/239 |
| 2009/0063823 | A1* | 3/2009 | Burky | G06F 9/3838 712/216 |
| 2011/0202775 | A1* | 8/2011 | Crispin | G06F 9/30018 713/190 |
| 2012/0124325 | A1* | 5/2012 | Kaplan | G06F 9/3828 711/207 |
| 2012/0144393 | A1* | 6/2012 | Vinh | G06F 9/3855 718/102 |

(Continued)

OTHER PUBLICATIONS

M. Shreedhar et al.; Efficient Fair Queuing Using Deficit Round-Robin; 1996 IEEE; pp. 375-384; <http://ieeexplore.ieee.org/stamp/stamp.jsp?arnumber=502236>.*

(Continued)

*Primary Examiner* — Thuy Dao
*Assistant Examiner* — Cuong V Luu

(57) ABSTRACT

A processor includes an execution unit to execute instructions and a scheduler unit to store a queue of instructions for execution by the execution unit. The scheduler unit includes a wake array including a plurality of source slots to store source identifiers for sources associated with the instructions, a picker to schedule a particular instruction for execution in the execution unit, broadcast a destination identifier associated with the particular instruction to a first subset of the source slots, and a delay element to receive the destination identifier broadcast by the picker and communicate a delayed version of the destination identifier to a second subset of the source slots different from the first subset.

20 Claims, 4 Drawing Sheets

(56) References Cited

U.S. PATENT DOCUMENTS

2013/0262824 A1* 10/2013 Arakawa .............. G06F 9/3851
                                                                         712/205

OTHER PUBLICATIONS

Jorge E. Carrillo E. et al.; The Effect of Reconfigurable Units in Superscalar Processors; 2001 ACM; pp. 141-150; <http://dl.acm.org/citation.cfm?id=360328>.*
Greg Semeraro et al.; Energy-Efficient Processor Design Using Multiple Clock Domains with Dynamic Voltage and Frequency Scaling; 2002 IEEE; 12 pages; <http://ieeexplore.ieee.org/stamp/stamp.jsp?arnumber=995696>.*
Tevfik Kosar et al.; A new paradigm Data-aware scheduling in grid computing; 2009 Elsevier; pp. 406-413; <http://www.sciencedirect.com/science/article/pii/S0167739X08001520>.*
Kevin Jeffay et al.; Proportional Share Scheduling of Operating System Services for Real-Time Applications; 1998 IEEE; 12 pages; <http://ieeexplore.ieee.org/stamp/stamp.jsp?arnumber=739781>.*
Paul E. McKenney; Stochastic Fairness Queuing; 1990 IEEE; pp. 733-740; <http://ieeexplore.ieee.org/stamp/stamp.jsp?arnumber=91316>.*

* cited by examiner

TRACKING SOURCE AVAILABILITY FOR INSTRUCTIONS IN A SCHEDULER INSTRUCTION QUEUE

BACKGROUND

Field of the Disclosure

The present disclosure generally relates to processors and, more particularly, to scheduling instructions based on source availability.

Description of the Related Art

Processors enhance processing efficiency by employing out-of-order execution, whereby instructions are executed in an order different from the program order of the instructions. A scheduler in the processor schedules and tracks instructions to identify when instructions are eligible for execution. A given instruction may have a plurality of sources for data on which it operates. For example, the given instruction may require data retrieved by a previous load operation or data from a previous arithmetic instruction. Thus, a source identifier may reference a load/store unit for data retrieved from the memory hierarchy, a physical register file in the processor, or an output of an execution unit. Such an instruction is referred to as a dependent instruction of the previous load instruction and/or the previous arithmetic instruction. The scheduler has a plurality of entries for holding instructions and each entry has a plurality of source slots that identify the sources for the instruction. The scheduler tracks source ready bits for each of the entries across all of the source slots, so that when all of the sources for an instruction are available, the instruction can be made eligible for execution.

When a given instruction is scheduled for execution, its resultant data is considered available as a source for its dependent instructions during a subsequent execution cycle. If the newly available source results in a particular dependent instruction having all of its sources available, the dependent instruction is eligible to be picked for execution in the next cycle. The scheduler broadcasts a destination identifier, referred to herein as a "source tag," identifying the source associated with the picked instruction to allow the source tracking information for the other instruction entries to be updated. This arrangement of source status tracking and broadcasting source tags to update the tracking information creates a loop-based timing path. The timing for such a path is difficult to implement as the logic must broadcast source tags across all entries and all of the source slot tracking bits to identify ready instructions for the next cycle. Increasing the size of the scheduler queue to enhance the out-of-order capabilities of the processor creates exacerbates the timing problem.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-4 illustrate example techniques for tracking source availability for instructions in a scheduler queue of an out-of-order processor. Data sources for an operand of a given instruction can be supplied by a load/store unit for data retrieved from the memory hierarchy, from a physical register file in the execution unit, or from an output of an execution unit. Instructions are typically made eligible for execution when all of the sources referenced by the instruction are available. The architecture of the processor determines the number of sources that an instruction may reference (e.g., four sources). A scheduler unit in the processor tracks the availability of sources for all instructions in its queue across all possible source slots. When a current instruction is scheduled for execution, its associated destination identifier, or source tag, is broadcast to all source slots of all scheduler instruction entries.

To relax the timing constraints for the source tracking loop in the scheduler unit, the source slots are divided into fast source slots and slow source slots. The source tag for a newly available source is broadcast to the fast source slots in the current cycle, while the slow source slots receive the source tag after a delay (e.g., one cycle). A potential performance penalty exists for instructions that are ready following the source tag broadcast to the slow source slots, as they would be delayed in being designated as ready. The likelihood of incurring this penalty is reduced given that most instructions do not use all available source slots. The potential penalty may be further mitigated by assigning sources that are already available to slow source slots and by switching the fast and slow source slots for entries where the sources in the designated fast source slots become available while the instruction is still waiting for sources tracked in slow source slots. Switching the fast and slow source slots results in the missing source being moved to a fast source slot so that when a subsequent tag is broadcast, the delay associated with the slow source slots is avoided. Due to the division of the source slots into fast and slow source slots, the timing loop only needs to process a subset of the source slots during the current clock cycle, thereby making the timing constraints easier to meet. Improving the timing constraints supports higher clock speeds, reduced power consumption, and increased scheduler queue size.

Figure 1:
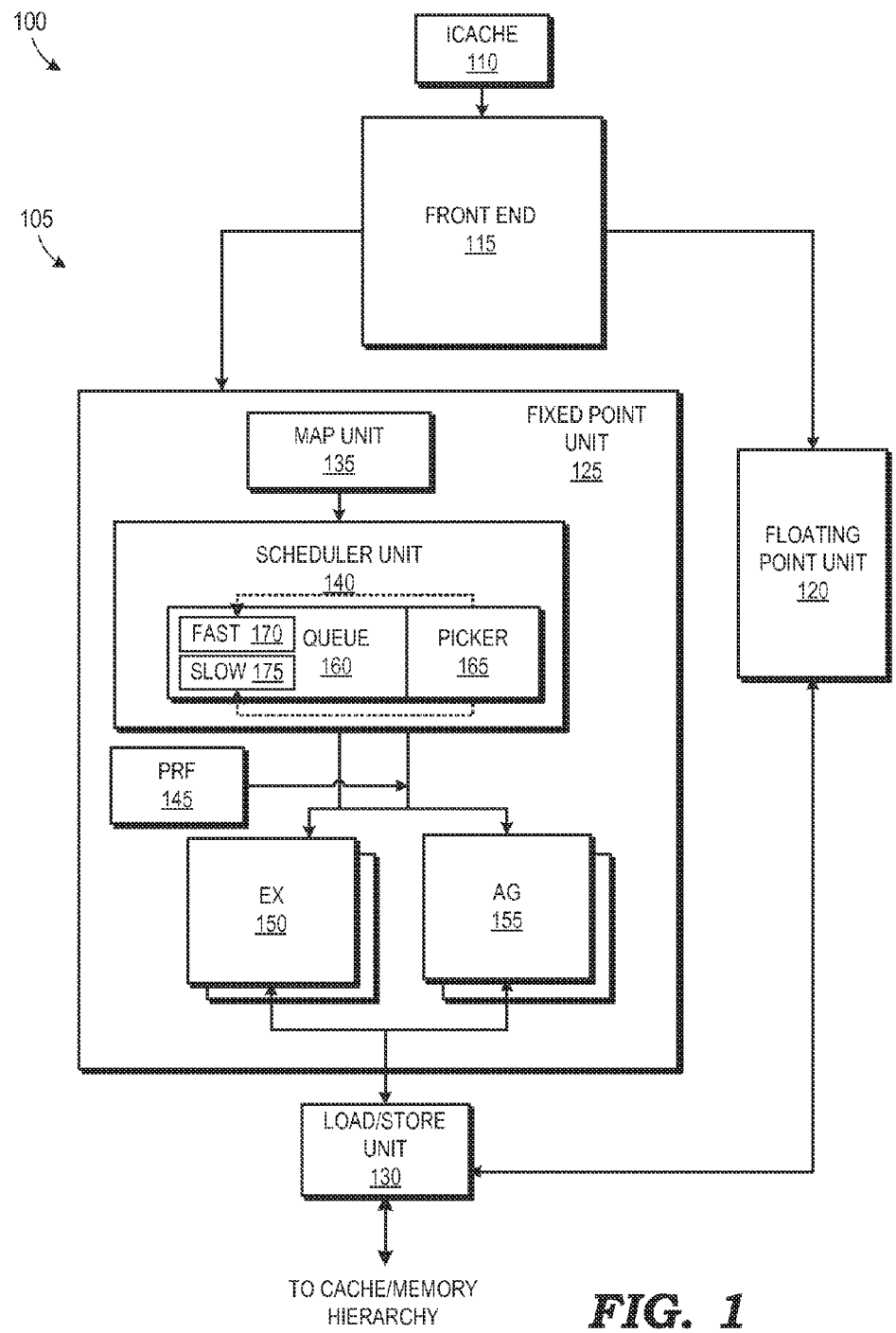
FIG. 1 is a block diagram of a processor core in accordance with some embodiments.

FIG. 1 illustrates a processor core 100 of a processor having an execution pipeline 105 that implements fast-slow source tracking, in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, game console, and the like.

In the depicted example, the execution pipeline 105 includes an instruction cache 110, a front end 115, one or more floating point units 120, and one or more fixed point units 125 (also commonly referred to as "integer execution units"). The processor core 100 also includes a load/store unit (LSU) 130 connected to a memory hierarchy, including one or more levels of cache (e.g., L1 cache, L2, cache, etc.), a system memory, such as system random access memory (RAM), and one or more mass storage devices, such as a solid-state drive (SSD) or an optical drive.

The instruction cache 110 stores instruction data which is fetched by the front end 115 in response to demand fetch operations (e.g., a fetch to request the next instruction in the instruction stream identified by the program counter) or in response to speculative prefetch operations. The front end 115 decodes the fetched instructions into one or more operations that are to be performed, or executed, by either the floating point unit 120 or the fixed point unit 125. In a microcoded processor architecture, this decoding can include translating the instruction into one or more micro-operations (uOps), whereby each uOp is identified by a corresponding opcode value and can be separately executed within the fixed point unit 125. Those operations involving floating point calculations are dispatched to the floating point unit 120 for execution, whereas operations involving fixed point calculations are dispatched to the fixed point unit 125.

The fixed point unit 125 includes a map unit 135, a scheduler unit 140, a physical register file (PRF) 145, one or more execution (EX) units 150 (e.g., arithmetic logic units (ALU)), and one or more address generation (AG) units 155. In general, both the EX units 150 and the AG units 155 are considered to be execution units in that they execute instructions. The scheduler unit 140 includes a scheduler queue 160 for storing instructions to be executed, and a picker 165 for dispatching instructions from the queue 160 to the execution units 150, 155. Operations requiring retrieval or storage of data, such as load or store operations, are dispatched by the picker 165 to one of the AG units 155, which calculates the memory address associated with the operation and directs the LSU 130 to perform the corresponding memory access using the generated address. Operations requiring numerical manipulations or other arithmetic calculations are dispatched to one of the EX units 150 for execution.

The PRF 145 stores a set of physical registers, each of which is associated with a different physical register name (PRN). As consistent with industry usage, the term "PRN," as used herein can refer to physical register that has that name. Thus, for example, "storing data at a PRN" indicates that the data is stored at the physical register identified by the PRN.

In an operation of the fixed point unit 125, the map unit 135 receives operations from the front end 115 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 135 and the scheduler unit 140 control the selective distribution of operations among the EX units 150 and AG units 155, whereby operations to be performed are queued in the scheduler queue 160 and then picked therefrom by the picker 165 for issue to a corresponding execution unit 150, 155. Typically, each queue entry of the scheduler queue 160 includes a field to store the operation payload or operation identifier (e.g., the opcode for the operation), source fields for the addresses or other identifiers of physical registers that contain the source operand(s) for the operation, fields to store any immediate or displacement values to be used with the operation, and a destination field that stores a destination identifier, such as the physical register in which the result of the execution of the corresponding operation is to be stored.

Prior to storing an operation in the scheduler queue 160, the map unit 135 performs register renaming whereby external operand names (i.e., architected register names (ARNs)) are translated into internal operand names (i.e., PRNs). In this renaming process, the map unit 135 evaluates a subset of operations including the operation to be queued to identify dependencies between sources and destinations associated with the operations and then maps architected registers to physical registers so as to avoid false dependencies and facilitate parallel execution of independent operations as using register renaming techniques known in the art.

The picker 165 monitors the scheduler queue 160 to identify operations ready for execution, and upon picking an available operation, dispatches the operation to an EX unit 150 or an AG unit 155. When the picker 165 schedules an instruction for execution, the destination PRN associated with the scheduled instruction becomes an available source PRN for other instructions in the scheduler queue 165. The scheduler unit 140 broadcasts a destination identifier, or source tag, to the scheduler queue 160 corresponding to the destination PRN of the picked instruction to update the list of instructions that have a status of ready, and are thus eligible for being picked for execution by the picker 165 during the next execution cycle. The scheduler unit 140 does not actually wait for the picked instruction to complete to designate the destination as being an available source for the other instructions, but rather speculatively designates the source as being available in anticipation of the eventual completion of the instruction. If the pipeline 105 later identifies that the source is not actually available when a subsequent instruction referencing the source is executed, a replay mechanism is employed to re-issue the invalid instruction(s).

As will be described in greater detail below, the scheduler unit 140 divides its source slots into fast source slots 170 and slow source slots 175. The source tag for a newly available source is broadcast to the fast source slots 170 after the associated instruction is picked by the picker 165, while the source tag broadcast for the slow source slots 175 is delayed (e.g., by one cycle delay). Hence, the modifiers "fast" and "slow" relate to the relative timing of the source tag broadcasts. The delay in broadcasting the source tag to the slow source slots 175 relaxes the timing constraints on the scheduler source tracking loop, as illustrated in greater detail below in FIG. 2.

Figure 2:
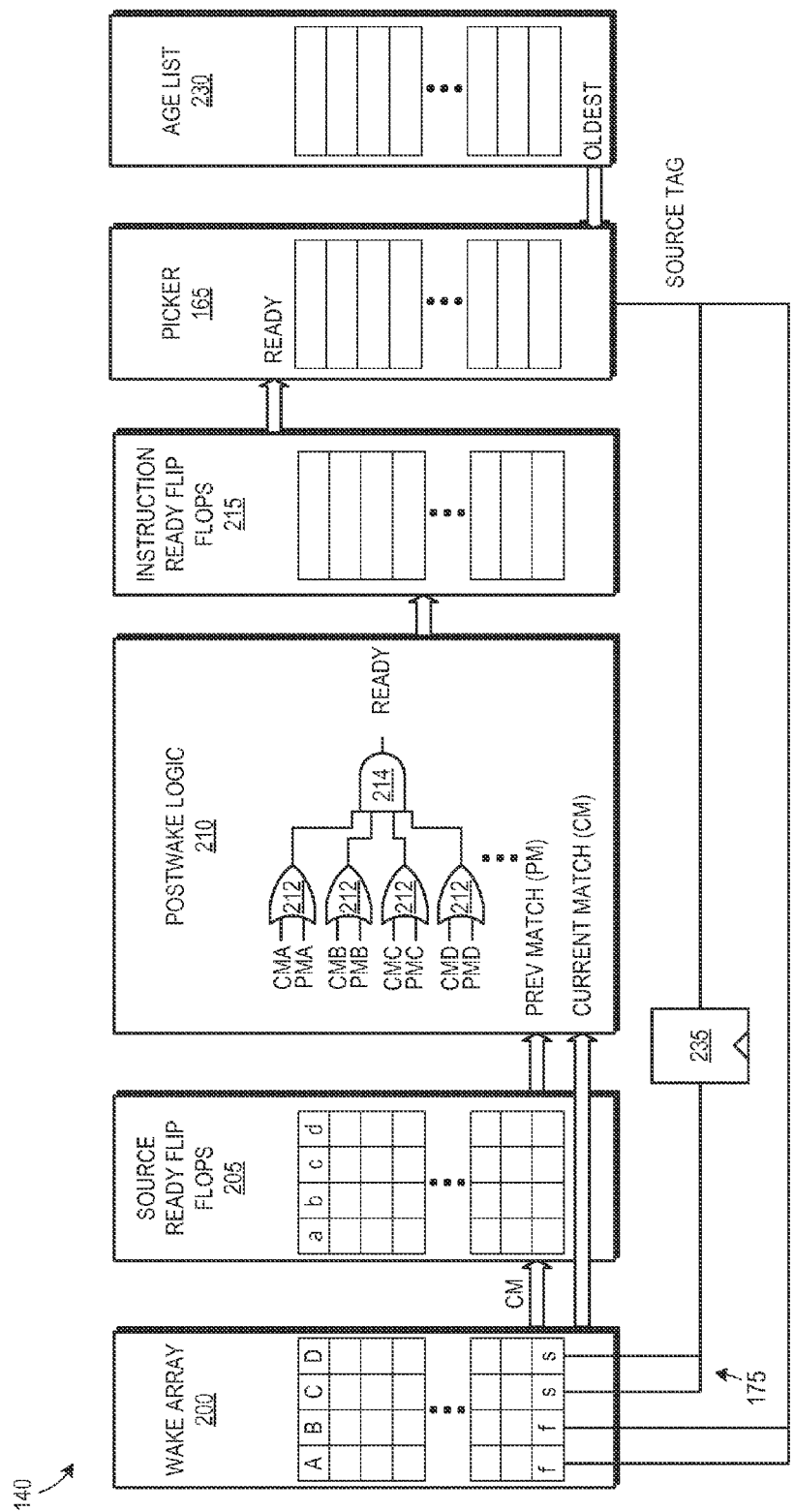
FIG. 2 is a block diagram of a scheduler in the processor core of FIG. 1 in accordance with some embodiments.

FIG. 2 is a diagram of the scheduler unit 140 illustrating a loop for tracking source availability of instructions, in accordance with some embodiments. The scheduler unit 140 includes a wake array 200, source ready flip flops 205, postwake logic 210, instruction ready flip flops 215, and an age list 230. The wake array 200 stores the sources associated with each of the instructions in the scheduler queue 160. In some embodiments, each instruction may have up to four valid sources, designated as A-D, although the number of valid sources may vary depending on the particular implementation. The wake array 200 stores an identifier representing each valid source, such as a PRN number. The source ready flip flops 205 store a ready bit, a-d, for each of the sources, A-D stored in the wake array 200. If the source "a" ready bit is set for a given entry, the corresponding source, "A", is available. Many instructions do not use all of the sources, so the unused sources are considered invalid. When an instruction is added to the scheduler queue 160, the source ready flip flops 205 for the instruction are set by the map unit 135 for any sources that are already available.

The postwake logic 210 evaluates current matches (CMA-CMD) in the wake array 200 to previous matches (PMA- PMD) in the source ready flip flops 205 to identify instructions that have all of their sources available for a given cycle. The post wake logic 210 includes OR gates 212 for determining if a particular source is available and an AND gate 214 for combining the source outputs from the OR gates 212 to determine if all of the sources for the instruction are available. In some embodiments, unused sources (invalid) may have their source ready values (PMA-PMD) set to 1 in the source ready flip flops 205 to make them appear as being ready. Alternatively, mask logic may be used to ignore the OR gates 212 associated with invalid sources. The gates 212, 214 are replicated for each entry in the scheduler queue 160. Those instructions that have all of their sources available have their corresponding ready bits set by the postwake logic 210 in the instruction ready flip flops 215.

The picker 165 selects one of the ready instructions for execution in the EX unit 150 or the AG unit 155. There are various techniques that may be employed by the picker 165 for choosing from among the ready instructions. In some embodiments, the scheduler unit 140 uses the age list 230 for tracking the relative ages of the instructions. The age list 230 entries may contain timestamps or ranks identifying the relative ages. The picker 165 may attempt to execute the oldest instruction, if it is ready. If the oldest instruction is not ready, it may pick the next oldest ready instruction, the first ready instruction in the scheduler queue 160, or a random ready instruction. In the illustrated example, the picker 165 uses an oldest/first technique, where the first ready instruction is picked if the oldest is not available.

When the picker 165 selects a ready instruction for execution, it broadcasts a source tag corresponding to the destination PRN of the instruction to the wake array 200. The sources in the wake array 200 are divided into fast source slots 170 (designated as "f") and slow source slots 175 (designated as "s"). The source tag is sent to the fast source slots 170 when the instruction is picked. The source tag is also sent to a data flip flop 235, or some other type of delay element, to delay the source tag broadcast to the slow source slots 175, e.g., by one clock cycle. The data flip flop 235 may include multiple elements depending on the number of bits needed to communicate the source tag.

Upon receiving a source tag, the wake array 200 compares the source tag to the source identifiers for each instruction entry to identify matches. Only the valid sources participate in the current match signal generation. If the source tag matches one of the sources in the source slots 170, 175, the appropriate current match signal, CMA-CMD, is driven high. The CM signals are sent to the source ready flip flops 205 and the post wake logic 210. The source ready flip flops 205 register the availability of the newly available source for the next clock cycle. The postwake logic 210 determines that a source is ready if its CM signal is high or its PM signal is high (bit set in source ready flip flops 205 from previous match).

For a source associated with one of the slow source slots 175, its CM signal is delayed one cycle as compared to a source stored in one of the fast source slots 170. It has been found from application traces that the majority of the instructions depend on two or less valid sources. The first two sources may be stored in the fast source slots 170. Because only the valid sources are checked in the wake array 200, there is no delay in identifying the ready status for instructions that only use two sources. If an instruction depends on more than two instructions, in the worst case, a one-cycle delay may be imposed for comparing the slow source slots 175 to identify the ready status. There are possible scenarios where the sources in the slow source slots 175 are already ready and the instruction is waiting for the sources in the fast source slots 170 to become available. In such cases, the scheduler unit 140 avoids the two-cycle instruction pick. The use of the data flip flop 235 to delay the source comparison for the slow source slots 175 reduces the gate complexity of the single cycle loop and also allows the designer to control the placement of the loop to reduce wire delays.

Although, there are potential cases in which performance degradation may be encountered for the slow source slots 175, and the resulting two-cycle instruction pick, this loss in performance can be avoided by choosing source slots based on source availability, and by switching fast and slow source slots if a source in a fast source slot 170 becomes available before a source in a slow source slot 175 for an instruction using more than two valid sources.

Figure 3:
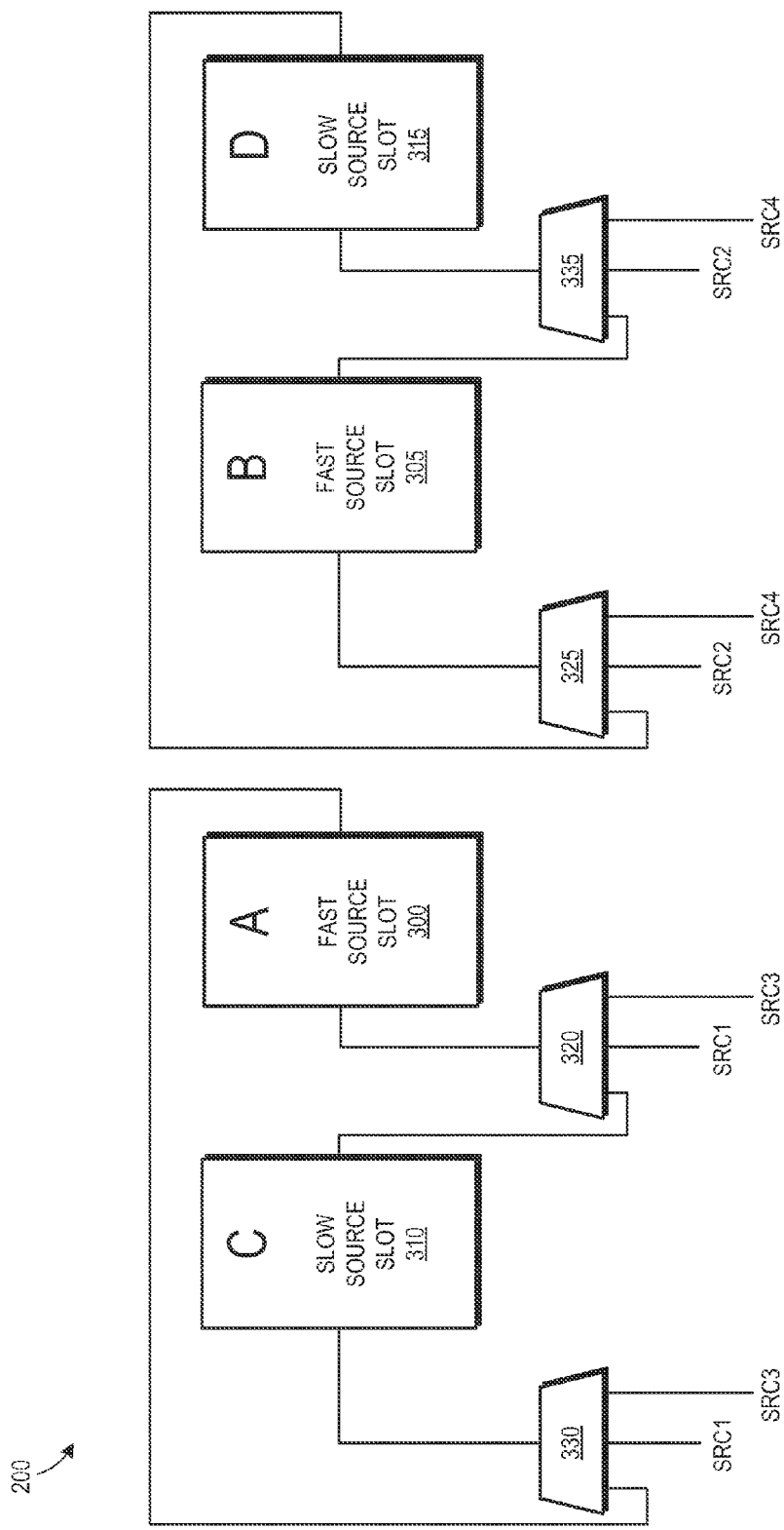
FIG. 3 is a diagram of a wake array in the scheduler of FIG. 2 illustrating source switching in accordance with some embodiments.

FIG. 3 is a diagram of the wake array 200 illustrating how sources can be selectively assigned or switched to avoid picking delays, in accordance with some embodiments. The wake array 200 includes fast source slots 300, 305, designated as A and B, and slow source slots 310, 315, designated as C and D. The source slots 300-315 store identifiers for the sources referenced by the instruction, such as PRN numbers. Input multiplexers 320-335 are associated with respective source slots 300-315 for receiving the source identifiers responsive to the scheduler unit 140 writing an entry in the scheduler queue 160. The source slots 300-315 and multiplexers 320-335 are replicated for each entry in the scheduler queue 160. In the illustrated example, four sources are available for each instruction, although not all of them may be used.

When the entry in the scheduler queue 160 is instantiated, the scheduler unit 140 stores the source identifiers in the wake array 200. The scheduler unit 140 stores source identifiers in the fast source slots 300, 305 preferentially to the slow source slots 310, 315. Hence, for an instruction with only two valid sources, the source identifiers are stored in the fast source slots 300, 305 (slots A and B). This arrangement avoids any performance penalty associated with the slow source slots 310, 315 (slots C and D).

The map unit 135 is aware of any sources that are already available, so the scheduler unit 140 may adjust the source slot locations based on source availability when an entry is instantiated. For example, consider an instruction having three sources, SRC1, SRC2, and SRC3. However, SRC1 is already available at the time the entry is to be written into the scheduler queue 160. The scheduler unit 140 configures the multiplexer 320 to select SRC3, the multiplexer 325 to select SRC2, and the multiplexer 330 to select SRC1. In this manner, SRC3 and SRC2 are stored in fast slots A and B, and the SRC1, which is already available, is stored in slow slot C. When the sources stored in slots A and B become available, the fast source slots 300, 305 receive the corresponding source tag broadcasts without a delay, and the slow source penalty is avoided.

In some instances, the sources stored in one or more of the fast source slots 300, 305 (slots A or B) may become ready prior to one or more of the sources in the slow source slots 310, 315 (slots C or D). In such instances, if the scheduler unit 140 were to wait for the sources in the slow source slots (310, 315) to become available, the slow source penalty would be incurred. To avoid the slow source penalty, the scheduler unit 140 employs a source switching technique to switch an available source in a fast source slot 300, 305 with an unavailable source in a slow source slot 310, 315.

Consider an example where an instruction has three sources, which are stored in slots A-C, respectively. When the entry is instantiated, the scheduler unit 140 configures the multiplexer 320 to select SRC1, the multiplexer 325 to select SRC2, and the multiplexer 330 to select SRC3. At some point, SRC1, stored in fast source slot 300 becomes available due to an instruction being picked and having its source tag broadcast to the fast source slots 300, 305 and the slow source slots 310, 315. Upon identifying the availability of the source resident in the fast source slot 300 and the unavailability of the source resident in the slow slot source 310, the scheduler unit 140 configures the multiplexer 320 to select the contents of the slow source slot 310 and the multiplexer 330 to select the contents of the fast source slot 300. The scheduler unit 140 triggers a write into the slots 300, 310, thereby switching their contents. The scheduler unit 140 also switches the ready bits, a and c, in the source ready flip flops 205 (see FIG. 2) corresponding to the switched slots A and C. Similar multiplexing logic may be employed for the source ready flip flops 205. In this manner, the ready source is moved to slow slot C and the pending source is moved to fast slot A. When the source in fast slot A becomes ready, its source tag is received by the fast source slot 300 without a delay, thereby avoiding the slow source penalty.

One common instruction having more than two valid sources, is an instruction having both a load component and an operation component. The load component retrieves data from memory, which is then used by the execution unit 150 along with other non-memory related sources to implement the operation component. In some embodiments, the scheduler unit 140 stores the memory related source in fast source slot A so that its presence is recognized sooner. The other execution related sources may be stored in the remaining fast source slot B or the slow source slots C or D depending on the number of sources. Once the memory fetch portion of the instruction is completed with good status, a source waiting in slow source slot C is switched with the ready source in fast slot A, as described above. After the source switching has taken place, the slow source penalty is avoided, as subsequent tag broadcasts will be received without delay in fast source slot A, similar to a two-source instruction. The only case when a 3 or 4 source instruction experiences a two-cycle pick is when the sources in the fast source slots 300, 305 and the slow source slots 310, 315 get ready in the same cycle, and the instruction has the highest priority to get picked in the next cycle. The combination of selective source slot assignments and source switching recovers most of the performance loss injected by the fast-slow source tracking system.

Note that the logic illustrated allows switching A and C or B and D. In some embodiments, the multiplexers may be widened to allow switching any slow source slot with any fast source slot, however, this increase in complexity may not be warranted for the few instructions that would employ it to avoid the slow source slot penalty.

The use of the fast-slow source tracking system described herein reduces timing constraints in the scheduler unit 140. Due to the improved timing characteristics, the processor core 100 may have a higher maximum clock frequency as compared to a processor without the fast-slow source tracking system. The higher clock speed may compensate for or even overcome any performance loss associated with the slow source penalty. The improved timing characteristics also reduce the need to use larger logic gates to meet the timing constraints, thereby reducing power consumption. The improved timing characteristics allow the size of the scheduler queue 160 to be increased, resulting in increased performance for the processor core 100.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 4:
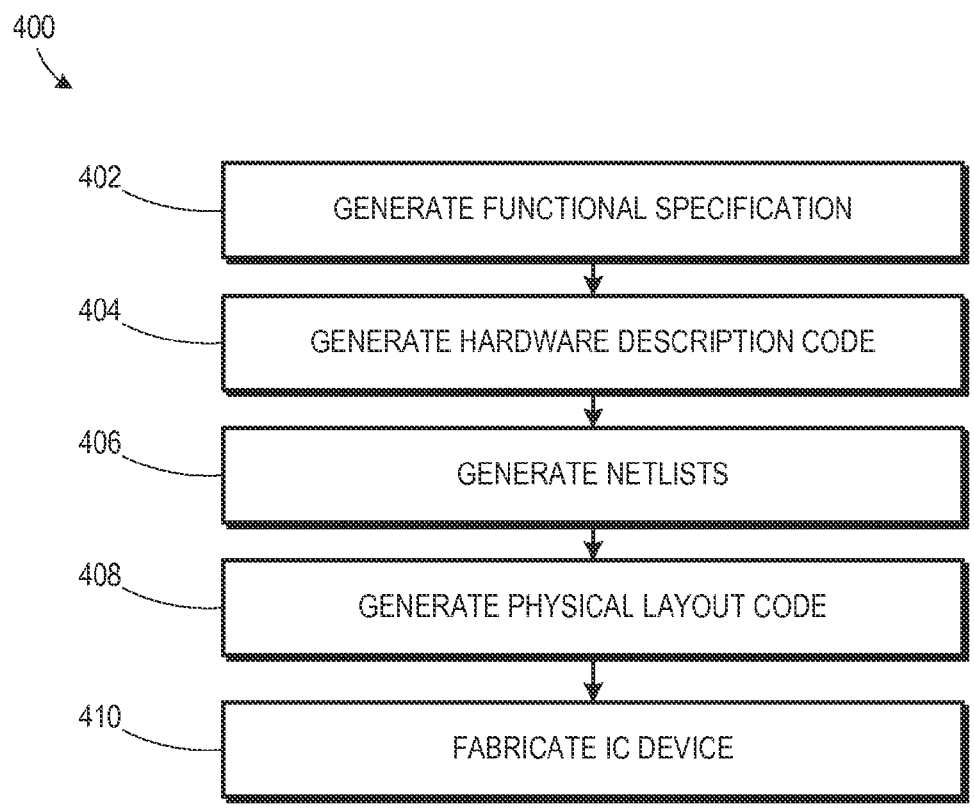
FIG. 4 is a flow diagram illustrating a method for designing and fabricating an integrated circuit device implementing at least a portion of a component of a processor in accordance with some embodiments.

FIG. 4 is a flow diagram illustrating an example method 400 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 402 a functional specification for the IC device is generated. The functional specification (often referred to as a micro architecture specification (MAS)) may be represented by any of a variety of programming languages or modeling languages, including C, C++, SystemC, Simulink, or MATLAB.

At block 404, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 406 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 408, one or more EDA tools use the netlists produced at block 406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes broadcasting a destination identifier to a first subset of a plurality of source slots in an instruction queue of a processor. The source slots store source identifiers associated with instructions in the queue. A delayed version of the destination identifier is broadcast to a second subset of the source slots different from the first subset.

As disclosed herein, in some embodiments a processor includes an execution unit to execute instructions and a scheduler unit to store a queue of instructions for execution by the execution unit. The scheduler unit includes a wake array including a plurality of source slots to store source identifiers for sources associated with the instructions, a picker to schedule a particular instruction for execution in the execution unit, broadcast a destination identifier associated with the particular instruction to a first subset of the source slots, and a delay element to receive the destination identifier broadcast by the picker and communicate a delayed version of the destination identifier to a second subset of the source slots different from the first subset.

As disclosed herein, in some embodiments a non-transitory computer readable medium stores code to adapt at least one computer system to perform a portion of a process to fabricate at least part of a processor. The processor includes an execution unit to execute instructions and a scheduler unit to store a queue of instructions for execution by the execution unit. The scheduler unit includes a wake array including a plurality of source slots to store source identifiers for sources associated with the instructions, a picker to schedule a particular instruction for execution in the execution unit, broadcast a destination identifier associated with the particular instruction to a first subset of the source slots, and a delay element to receive the destination identifier broadcast by the picker and communicate a delayed version of the destination identifier to a second subset of the source slots different from the first subset.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method comprising:
broadcasting a destination identifier to a first subset of a plurality of source slots in an instruction queue of a processor, the source slots storing source identifiers associated with instructions in the instruction queue, the destination identifier indicating a data source is available for use by an instruction; and
broadcasting a delayed version of the destination identifier to a second subset of the plurality of source slots different from the first subset.

2. The method of claim 1, wherein broadcasting the delayed version comprises:
broadcasting the destination identifier to a delay element; and
broadcasting the delayed version of the destination identifier from the delay element to the second subset of the source slots.

3. The method of claim 2, wherein the delay element comprises a flip flop.

4. The method of claim 1, further comprising:
designating data sources associated with instructions having source identifiers matching the destination identifier as being available for use by the associated instructions.

5. The method of claim 4, further comprising:
modifying an entry in the instruction queue for a first instruction having a first source identifier stored in a source slot in the first subset matching the destination identifier to switch the first source identifier with a second source identifier stored in a source slot in the second subset.

6. The method of claim 1, further comprising:
designating a particular instruction in the instruction queue as ready for execution in the processor responsive to determining that all of the source identifiers associated with the particular instruction correspond to available sources.

7. The method of claim 1, further comprising:
broadcasting the destination identifier associated with a particular instruction in the instruction queue responsive to scheduling the particular instruction for execution in the processor.

8. The method of claim 1, further comprising:
storing a first source identifier corresponding to an available source associated with a particular instruction in one of the second subset of the source slots when instantiating an entry in the instruction queue for the particular instruction.

9. The method of claim 8, further comprising:
storing a second source identifier corresponding to an unavailable source associated with the particular instruction in one of the first subset of the source slots when instantiating the entry.

10. The method of claim 1, further comprising:
prioritizing storing source identifiers associated with a particular instruction in the first subset of the source slots when instantiating an entry in the instruction queue for the particular instruction over storing source identifiers associated with the particular instruction in the second subset of the source slots.

11. A processor, comprising:
an execution unit to execute instructions; and
a scheduler unit to store a queue of instructions for execution by the execution unit, the scheduler unit comprising:
a wake array including a plurality of source slots to store source identifiers for sources associated with the instructions;
a picker to schedule a particular instruction for execution in the execution unit, broadcast a destination identifier associated with the particular instruction to a first subset of the source slots, the destination identifier indicating a data source is a available for use by an instruction; and
a delay element to receive the destination identifier broadcast by the picker and communicate a delayed version of the destination identifier to a second subset of the plurality of source slots different from the first subset.

12. The processor of claim 11, wherein the delay element comprises a flip flop coupled between the picker and the second subset of the source slots.

13. The processor of claim 11, further comprising:
a plurality of source ready flip flops corresponding to the source slots, wherein the wake array is operable to set the source ready flip flops storing source identifiers matching the destination identifier.

14. The processor of claim 13, further comprising:
a plurality of instruction ready flip flops corresponding to the instructions in the queue; and
logic to set a particular instruction ready flip flop for an instruction having all of its sources available, wherein the picker is to select the particular instruction from a set of instructions having their respective instruction ready flip flops set.

15. The processor of claim 11, wherein the scheduler unit is to modify an entry in the queue for a first instruction having a first source identifier stored in a source slot in the first subset matching the destination identifier to switch the first source identifier with a second source identifier stored in a source slot in the second subset.

16. The processor of claim 11, wherein the scheduler unit is to store a first source identifier corresponding to an available source associated with a first instruction in one of the second subset of the source slots when instantiating an entry in the queue for the first instruction.

17. The processor of claim 16, wherein the scheduler unit is to store a second source identifier corresponding to an unavailable source associated with the first instruction in one of the first subset of the source slots when instantiating the entry.

18. The processor of claim 11, wherein the scheduler unit is to prioritize storing source identifiers associated with a first instruction in the first subset of the source slots when instantiating an entry in the queue for the first instruction over storing source identifiers associated with the first instruction in the second subset of the source slots.

19. A non-transitory computer readable medium storing code to adapt at least one computer system to perform a portion of a process to fabricate at least part of a processor, the processor comprising:
an execution unit to execute instructions; and
a scheduler unit to store a queue of instructions for execution by the execution unit, the scheduler unit comprising:
a wake array including a plurality of source slots to store source identifiers for sources associated with the instructions;
a picker to schedule a particular instruction for execution in the execution unit, broadcast a destination identifier associated with the particular instruction to a first subset of the source slots the destination identifier indicating a data source is available for use by an instruction; and
a delay element to receive the destination identifier broadcast by the picker and communicate a delayed version of the destination identifier to a second subset of the plurality of source slots different from the first subset.

20. The non-transitory computer readable medium of claim 19, wherein the scheduler unit is to modify an entry in the queue for a first instruction having a first source identifier stored in a source slot in the first subset matching the destination identifier to switch the first source identifier with a second source identifier stored in a source slot in the second sub set.

* * * * *